(12) United States Patent
Joshi et al.

(10) Patent No.: US 7,942,008 B2
(45) Date of Patent: May 17, 2011

(54) METHOD AND SYSTEM FOR REDUCING POWER PLANT EMISSIONS

(75) Inventors: Narendra Digamber Joshi, Cincinnati, OH (US); Lautaro Aspiazu Montgomery, Mason, OH (US); James William Stegmaier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1078 days.

(21) Appl. No.: 11/539,651

(22) Filed: Oct. 9, 2006

(65) Prior Publication Data
US 2008/0083226 A1 Apr. 10, 2008

(51) Int. Cl.
*F02C 1/00* (2006.01)
*F02G 1/00* (2006.01)

(52) U.S. Cl. ............... 60/772; 60/39.5; 60/39.52

(58) Field of Classification Search ......... 60/728, 60/773, 791, 39.17, 39.52, 39.182
See application file for complete search history.

(56) References Cited

U.S. PATENT DOCUMENTS

| | | | |
|---|---|---|---|
| 5,459,994 A | 10/1995 | Drnevich | |
| 5,724,805 A * | 3/1998 | Golomb et al. | ............ 60/783 |
| 6,237,339 B1 | 5/2001 | Asen et al. | |
| 6,280,505 B1 | 8/2001 | Torkildsen et al. | |
| 6,655,150 B1 | 12/2003 | Asen et al. | |
| 6,957,539 B2 * | 10/2005 | Lebas et al. | ............ 60/772 |
| 7,266,940 B2 * | 9/2007 | Balan et al. | ............ 60/39.181 |
| 2004/0170935 A1 | 9/2004 | Lebas et al. | |
| 2006/0272331 A1 * | 12/2006 | Bucker et al. | ............ 60/774 |
| 2007/0034171 A1 | 2/2007 | Griffin et al. | |
| 2008/0010967 A1 | 1/2008 | Griffin et al. | |
| 2008/0104939 A1 * | 5/2008 | Hoffmann et al. | ............ 60/39.5 |
| 2008/0134660 A1 * | 6/2008 | Finkenrath et al. | ............ 60/39.52 |

FOREIGN PATENT DOCUMENTS

| | | |
|---|---|---|
| DE | 10 2004 039 164 A1 | 3/2006 |
| EP | 0626510 A1 | 11/1994 |
| EP | 1752616 A2 | 3/2006 |
| WO | 2005 064232 A1 | 7/2005 |

OTHER PUBLICATIONS

EP Search Report, Application No. EP 07 11 7812 (Jan. 22, 2008).

* cited by examiner

*Primary Examiner* — William H Rodriguez
*Assistant Examiner* — Young Choi
(74) *Attorney, Agent, or Firm* — William Scott Andes, Esq.; Armstrong Teasdale LLP

(57) ABSTRACT

A method for operating a power plant to facilitate reducing emissions, wherein the power plant includes a gas turbine engine assembly and a carbon dioxide ($CO_2$) separator. The method includes increasing an operating pressure of exhaust gas discharged from the gas turbine engine assembly, separating substantially all the $CO_2$ entrained within the gas turbine engine utilizing the $CO_2$ separator to produce a $CO_2$ lean airstream, reducing the operating temperature of the $CO_2$ lean airstream, and utilizing the cooled $CO_2$ lean airstream to facilitate reducing an operating temperature of air entering the gas turbine engine assembly.

7 Claims, 4 Drawing Sheets

METHOD AND SYSTEM FOR REDUCING POWER PLANT EMISSIONS

BACKGROUND OF THE INVENTION

This application relates generally to power generating facilities and, more particularly, to a power generating system and method for reducing the emission of greenhouse gases.

Air pollution concerns worldwide have led to stricter emissions standards. These standards regulate the emission of oxides of nitrogen (NOx), unburned hydrocarbons (HC), carbon monoxide (CO), and carbon dioxide ($CO_2$), generated by the power industry. In particular, carbon dioxide has been identified as a greenhouse gas, resulting in various techniques being implemented to reduce the concentration of carbon dioxide being discharged to the atmosphere.

One such technique utilizes an amine process to separate the carbon dioxide from the other exhaust gases. More specifically, amine is injected into the exhaust stream of a known gas turbine engine prior to the exhaust stream being discharged to atmosphere. For example, when the exhaust stream is discharged to atmosphere, the partial pressure of the carbon dioxide within the exhaust stream is approximately 2% to 5% percent of the total pressure of the exhaust stream. As such, a relatively large quantity of amine is required to remove the relatively small quantity of carbon dioxide from the total volume of the exhaust stream. As a result, current technology for separating carbon dioxide from other exhaust gases within the exhaust stream is relatively expensive and may result in a power plant power loss of approximately ten percent.

BRIEF SUMMARY OF THE INVENTION

In one aspect, a method for operating a power plant to facilitate reducing emissions, wherein the power plant includes a gas turbine engine assembly and a carbon dioxide ($CO_2$) separator. The method includes increasing an operating pressure of exhaust stream discharged from the gas turbine engine assembly, reducing the operating temperature of the exhaust stream, separating substantially all the $CO_2$ entrained within the exhaust stream utilizing the $CO_2$ separator to produce a $CO_2$ lean exhaust stream, reducing the operating temperature of the $CO_2$ lean exhaust stream, and utilizing the cooled $CO_2$ lean exhaust stream to facilitate reducing an operating temperature of air entering the gas turbine engine assembly.

In another aspect, a power plant is provided. The power plant includes a gas turbine engine assembly, a carbon dioxide ($CO_2$) separator in flow communication with said gas turbine engine assembly configured to substantially remove the $CO_2$ entrained within the gas turbine engine exhaust stream utilizing the $CO_2$ separator to produce a $CO_2$ lean exhaust stream, and an expander configured to reduce the operating temperature of the $CO_2$ lean exhaust stream such that the cooled lean exhaust stream may be utilized to facilitate reducing an operating temperature of air entering the gas turbine engine assembly.

DETAILED DESCRIPTION OF THE INVENTION

Figure 1:
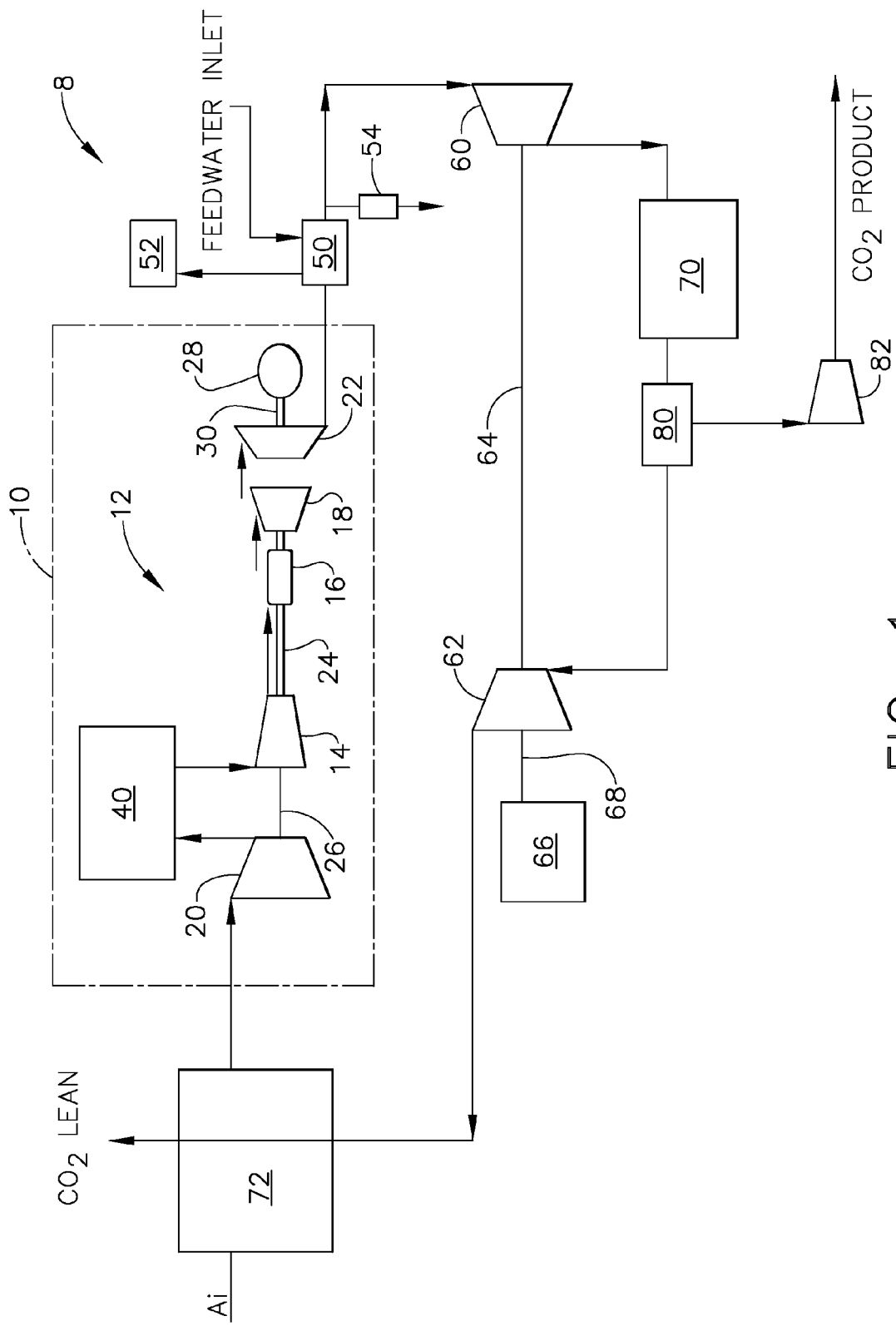
FIG. 1 is a schematic illustration of an exemplary power plant.

FIG. 1 is a schematic illustration of a power plant 8 that includes an exemplary gas turbine engine assembly 10. Gas turbine engine assembly 10 includes a core gas turbine engine 12 that includes a high-pressure compressor 14, a combustor 16, and a high-pressure turbine 18. Gas turbine engine assembly 10 also includes a low-pressure compressor 20 and a low-pressure turbine 22. High-pressure compressor 14 and high-pressure turbine 18 are coupled by a first shaft 24, and low-pressure compressor 20 is coupled to an intermediate pressure turbine (not shown) by a second shaft 26. In the exemplary embodiment, low-pressure turbine 22 is coupled to a load, such as a generator 28 via a shaft 30. In the exemplary embodiment, core gas turbine engine 12 is an LMS100 available from General Electric Aircraft Engines, Cincinnati, Ohio.

In the exemplary embodiment, gas turbine engine assembly 10 may include an intercooler 40 to facilitate reducing the temperature of the compressed airflow entering high-pressure compressor 14. More specifically, intercooler 40 is coupled in flow communication between low-pressure compressor 20 and high-pressure compressor 14 such that airflow discharged from low-pressure compressor 20 is cooled prior to being supplied to high-pressure compressor 14. In the exemplary embodiment, intercooler 40 is a water-to-air heat exchanger that has a working fluid (not shown) flowing therethrough. For example, the working fluid may be raw water that is channeled from a body of water located proximate to power plant 8, such as a lake, for example. Optionally, intercooler 40 is an air-to-air heat exchanger that has a cooling airflow (not shown) flowing therethrough. Optionally, gas turbine engine assembly 10 does not include intercooler 40.

Power plant 8 also includes a heat recovery steam generator (HRSG) 50 that is configured to receive the relatively hot exhaust stream discharged from the gas turbine engine assembly 10 and transfer this heat energy to a working fluid flowing through the HSRG 50 to generate steam which, in the exemplary embodiment, may be used to drive a steam turbine 52. Moreover, a drain 54 is coupled downstream from HSRG 50 to substantially remove the condensate from the exhaust stream discharged from HSRG 50.

The power plant 8 also includes a second low-pressure compressor 60, an expander 62, and a shaft 64 used to couple second low-pressure compressor 60 to expander 62. Expander, as used herein, is defined as a centrifugal or axial flow turbine through which a high-pressure gas is expanded to produce work that is typically used to drive a compressor, such as low-pressure compressor 60. Moreover, expander 62 may also be referred to as a turboexpander or expansion turbine by one skilled in the art. Expander 62 is coupled to a prime mover 66, such as an electric motor, a gas turbine, or a reciprocating engine, via a shaft 68. As such, prime mover 66 is utilized to drive the low-pressure compressor 60, assisted by the expander 62, as will be discussed below.

The power plant 8 also includes a second intercooler or heat exchanger 70 that is coupled in flow communication between low-pressure compressor 60 and expander 62. In operation, the exhaust stream discharged from low-pressure compressor 60 is channeled through intercooler 70 to provide cooling prior to the exhaust stream being supplied to $CO_2$ removal unit 80 and the expander 62. In the exemplary embodiment, intercooler 70 is a water-to-air heat exchanger that has a working fluid (not shown) flowing therethrough. For example, as discussed above, the working fluid may be raw water that is channeled from a body of water located proximate to power plant 8. Optionally, intercooler 70 is an air-to-air heat exchanger that has a cooling airflow (not shown) flowing therethrough. The exhaust stream discharged from expander 62 is then supplied to a third heat exchanger 72 to facilitate reducing the operational temperature of the inlet air supplied to gas turbine engine assembly 10, as will be discussed below.

During operation, ambient air is drawn into the gas turbine through is channeled through heat exchanger 72 to facilitate reducing the operational temperature of the ambient air being supplied to gas turbine engine assembly 10. Gas turbine engine assembly 10 is operated as known in the art, and as such, produces an exhaust stream having a temperature of between approximately 600 and 1300 degrees Fahrenheit (° F.). The exhaust stream discharged from gas turbine engine assembly 10 is channeled through HRSG 50 wherein a substantial portion of the heat energy from the exhaust stream is transferred to the working fluid channeled therethrough to generate steam that as discussed above, that may be utilized to drive steam turbine 52. HSRG 50 facilitates reducing the operational temperature of the exhaust stream to a temperature that is between approximately 75 degrees F. and approximately 125 degrees F. In the exemplary embodiment, HSRG 50 facilitates reducing the operational temperature of the exhaust stream to a temperature that is approximately 100 degrees F. In one embodiment, the exhaust stream may also be channeled through additional heat exchangers (not shown) to further condense water from the exhaust stream, which water is then discharged through drain 54, for example.

The relatively cool dry exhaust stream is then compressed in second low-pressure compressor 60, which in the exemplary embodiment, is driven by expander 62, and prime mover 66 if required. Second low-pressure compressor 60 is utilized to increase the operating pressure of the exhaust stream channeled therethrough to a pressure that is approximately four times greater than the operating pressure of the exhaust stream discharged from gas turbine engine assembly 10. Moreover, channeling the exhaust stream through the second low-pressure compressor causes the temperature of the exhaust stream to increase. The exhaust stream discharged from second low-pressure compressor 60 is then channeled through a second intercooler 70 to facilitate reducing the operational temperature of the exhaust stream. In the exemplary embodiment, second intercooler 70 facilitates reducing the operational temperature of the exhaust stream to a temperature that is approximately 100 degrees F.

The high-pressure, relatively dry, $CO_2$ rich exhaust stream discharged from intercooler 70 is then contacted with an amine solution to facilitate absorbing substantially all of the $CO_2$ entrained within the exhaust stream utilizing a $CO_2$ separator 80. Moreover, the $CO_2$ amine stream may be heated utilizing the second intercooler 70 to facilitate reducing the amount of sensible energy required to drive/boil $CO_2$ out of the amine solution. The $CO_2$ extracted from the exhaust stream is then compressed in a compressor 82. The compressed $CO_2$ may be bottled and sold or discharged to a pipeline for injection in depleted oil wells, if desired.

The $CO_2$ lean exhaust stream discharged from the $CO_2$ separator is then allowed to expand through expander 62 which extracts work from the pressurized exhaust gases to drive low-pressure compressor 60, thus reducing the temperature of the exhaust stream substantially. For example, in one embodiment, the temperature of the exhaust stream discharged from expander 62 is between approximately 30 and −30 degrees F. In the exemplary embodiment, the temperature of the exhaust stream discharged from expander 62 is approximately −20 degrees F.

The relatively cooler exhaust stream is then channeled through heat exchanger 72 to facilitate cooling the inlet air stream, and to facilitate increasing the air density of the airflow that is channeled to gas turbine engine assembly 10, thus increasing the efficiency and power output of the core gas turbine engine 12. As a result, the reduction in the inlet temperature of the air flow to the gas turbine increases its mass flow and efficiency reducing the economic impact of the $CO_2$ sequestration process.

Figure 2:
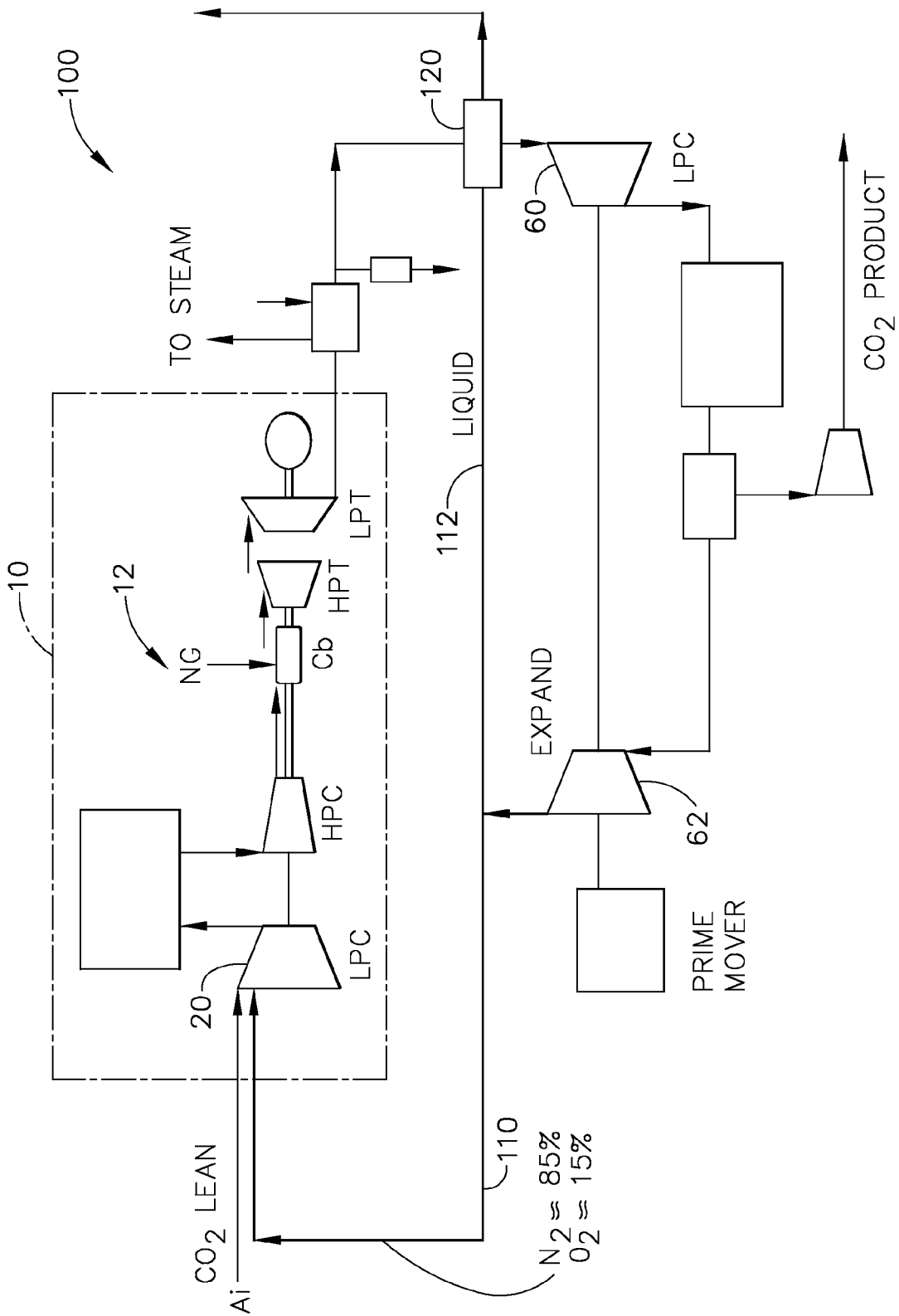
FIG. 2 is a schematic illustration of another exemplary power plant.

FIG. 2 is a schematic illustration of another exemplary power plant 100. Power plant 100 is substantially similar to power plant 8, shown in FIG. 1. As such, components shown in FIG. 2 that are similar to components shown in FIG. 1 will be identified with the same label. In the exemplary embodiment, power plant 100 does not include heat exchanger 72, rather the relatively cool dry exhaust stream discharged from expander 62 is separated into a first airstream portion 110 that is discharged directly into the inlet of gas turbine engine assembly 10 and a second airstream portion 112 that is channeled through a heat exchanger 120 that is positioned upstream from second low-pressure compressor.

During operation, the first airstream 110 is channeled directly into the inlet airstream supplied to gas turbine engine assembly 12. More specifically, any moisture still entrained within incoming fresh airstream is condensed into relatively small or microscopic droplets which produces a fine fog or mist, when mixed with the airstream 110. The fog or mist is then channeled into low-pressure compressor 20 wherein the droplets evaporate to facilitate reducing the operational temperature of the airflow supplied to core gas turbine engine 12. As a result, the temperature of the airflow channeled into the core gas turbine engine 12 is decreased, thus reducing the work required in the compression process and increasing the overall efficiency of the gas turbine engine assembly 10. The Oxygen content of the stream 110 is reduced due to the combustion process in the gas turbine 10. The mixing of this stream with fresh air results in a net reduction of Oxygen content of the combustion air in combustor 16 facilitating reduction of NOx formation in the combustor.

The second exhaust airstream 112 is channeled through heat exchanger 120 to facilitate removing heat energy from the exhaust stream channeled into second low-pressure compressor 60 and to facilitate condensing and removing water entrained in the exhaust airstream prior to the exhaust airstream entering second low-pressure compressor 60.

Figure 3:
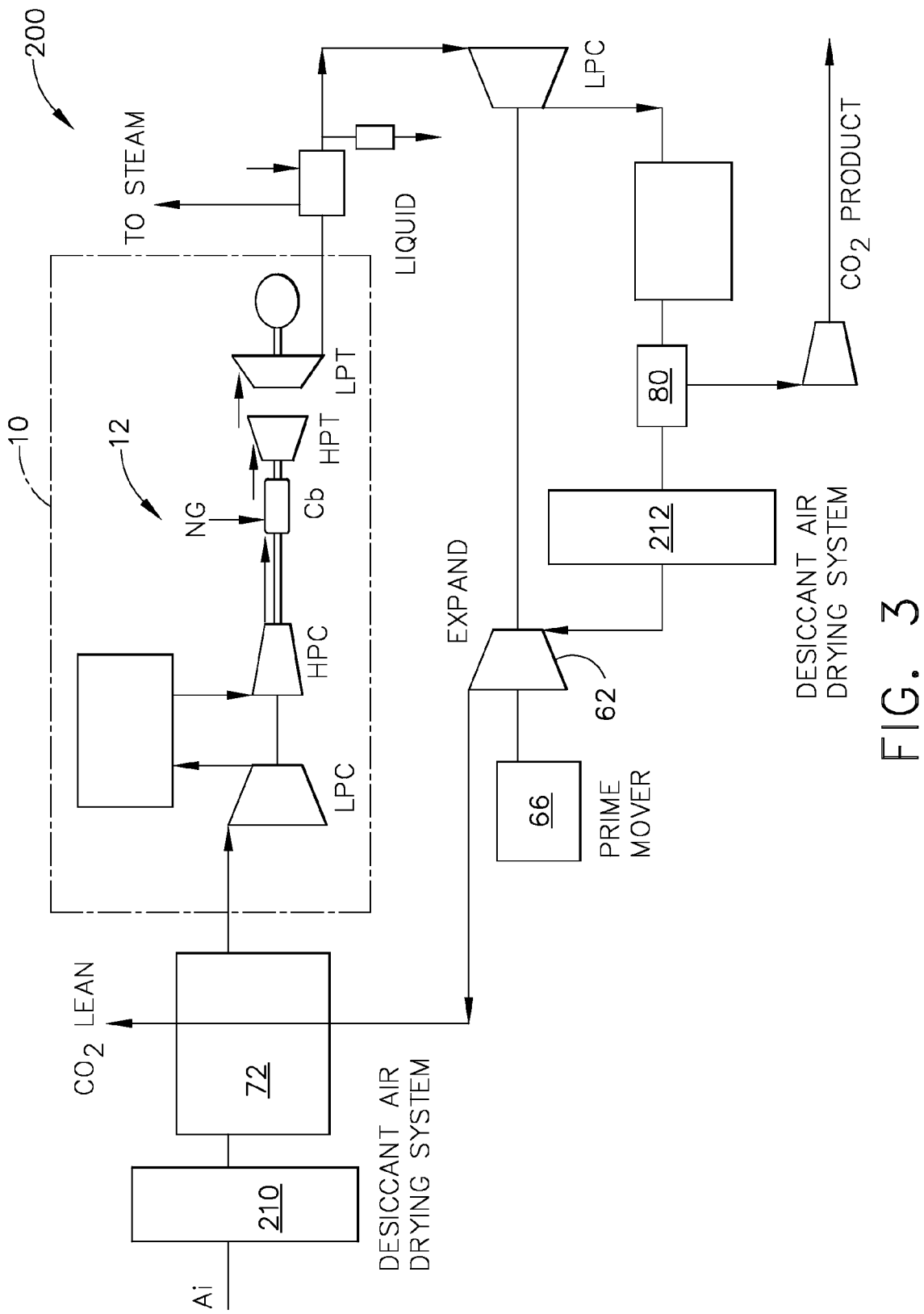
FIG. 3 is a schematic illustration of another exemplary power plant.

FIG. 3 is a schematic illustration of another exemplary power plant 200. Power plant 200 is substantially similar to power plant 8, shown in FIG. 1. As such, components shown in FIG. 3 that are similar to components shown in FIG. 1 will be identified with the same label. In the exemplary embodiment, power plant 200 also includes a first desiccant air drying system 210 and a second desiccant air drying system 212. First desiccant air drying system 210 is positioned upstream from heat exchanger 72 such that the exhaust stream discharged from first desiccant air drying system 210 is channeled through heat exchanger 72 and into gas turbine engine assembly 12. Moreover, second desiccant air drying system 212 is positioned downstream from $CO_2$ separator 80 and upstream from expander 62 such that the $CO_2$ lean exhaust stream discharged from $CO_2$ separator 80 is channeled directly into expander 62. During operation, first desiccant air drying system 210 facilitates removing moisture from the inlet air permitting the system to reduce the inlet air temperature to a temperature that is below approximately 40 degrees F. and thus preclude ice formation on the surfaces of gas turbine engine assembly 12. Moreover, second desiccant air drying system 212 facilitates removing moisture entrained within the exhaust stream channeled to expander 62 to permit expander 62 to extract energy from the exhaust stream to allow the exit temperature of the expander to be lower than the icing condition.

Figure 4:
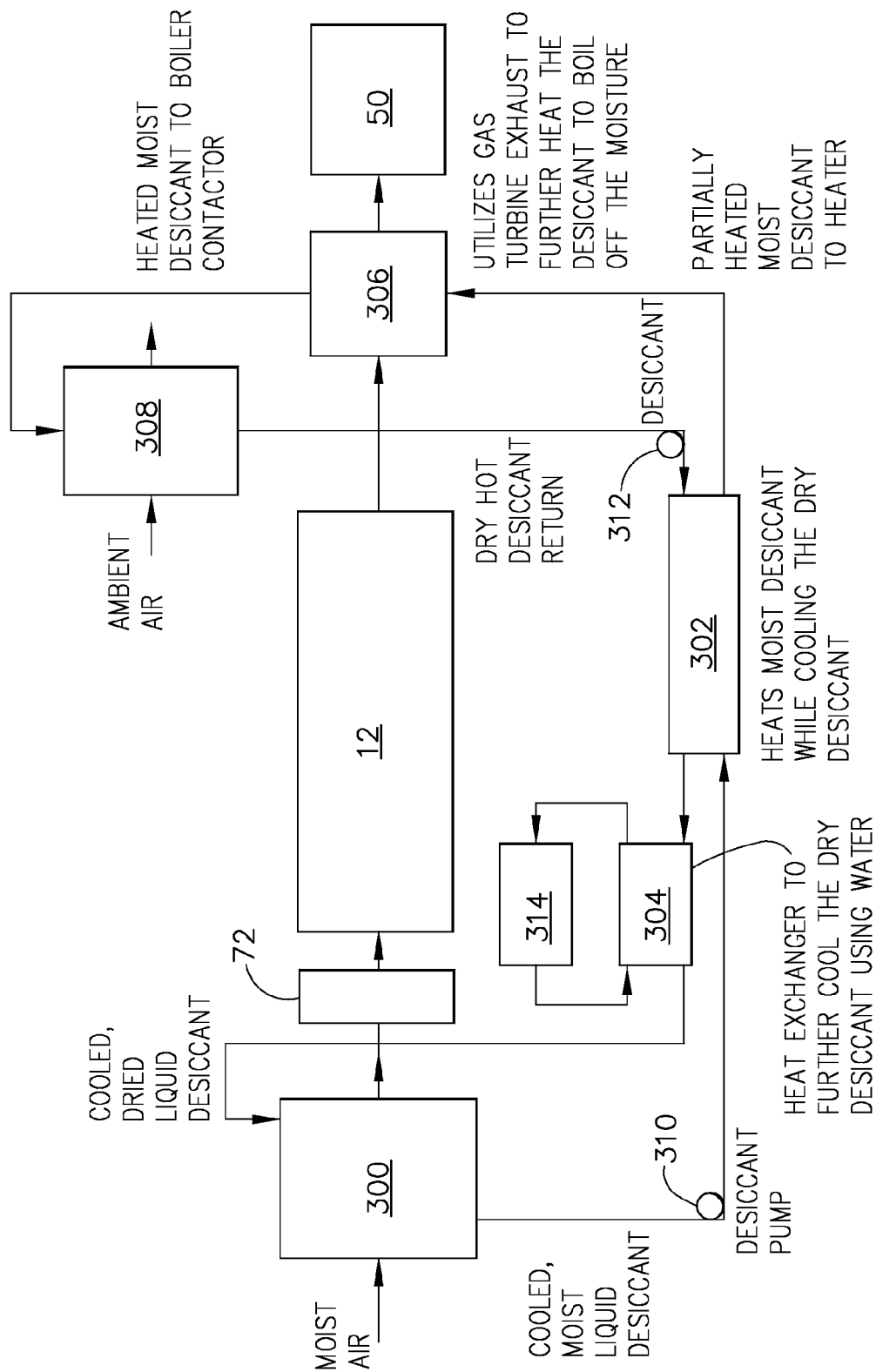
FIG. 4 is a schematic illustration of an exemplary desiccant system that may be utilized with the power plant shown in FIG. 3.

FIG. 4 is a schematic illustration of an exemplary desiccant system 210 that may be utilized with the power plant 200 shown in FIG. 3. In this embodiment, desiccant systems 210 and 212 each include an air contactor 300, a first heat exchanger 302, a second heat exchanger 304, a third heat exchanger 306, a contactor boiler 308, a first desiccant pump 310, a second desiccant pump 312, and a cooling tower 314.

In use, moist inlet air is channeled through air contactor 300 wherein the moisture from the inlet air is substantially absorbed by the desiccant flowing therethrough. The moisture laden liquid desiccant is channeled through first heat exchanger 302 utilizing first desiccant pump 310. The first heat exchanger 302 is utilized to increase the temperature of the moisture-laden desiccant flowing therethrough. In the exemplary embodiment, the temperature of the moisture laden desiccant is increased utilizing a working fluid flowing therethrough, which in the exemplary embodiment, is a relatively warm liquid desiccant which will be termed herein as the "dry desiccant" to more clearly describe systems 210 and 212. As such, warm liquid desiccant is utilized to increase the operating temperature of the moisture-laden desiccant within heat exchanger 302. The partially heated moist desiccant is then channeled through heat exchanger 306 wherein the heat energy from gas turbine engine exhaust stream is absorbed by the moist desiccant to further increase the temperature of the moist desiccant which is then channeled through contactor boiler 308 wherein the moisture from the desiccant is removed to produce dry desiccant. The dry desiccant is then channeled through heat exchanger 302, utilizing second desiccant pump 312, to heat the moist desiccant as described above. The dry desiccant is then channeled through heat exchanger 304 to facilitate further cooling the dry desiccant. More specifically, and in the exemplary embodiment, heat exchanger 304 is a water-to-air heat exchanger that is configured to receive cooling water from cooling tower 314 to cool the dry desiccant. The cooled dry liquid desiccant is then channeled through air contactor 300 wherein the process is continually repeated to remove moisture from the inlet air.

Described herein is a method and system for reducing power plant emissions and also increasing power plant efficiency. The method includes increasing an operating pressure of exhaust gas discharged from the gas turbine engine assembly, separating substantially all the $CO_2$ entrained within the exhaust gas utilizing the $CO_2$ separator to produce a $CO_2$ lean airstream, reducing the operating temperature of the $CO_2$ lean airstream, and utilizing the cooled $CO_2$ lean airstream to facilitate reducing an operating temperature of air entering the gas turbine engine assembly.

More specifically, reducing the inlet temperature of the air flow to the gas turbine engine facilitates increasing its mass flow and efficiency thus reducing the economic impact of the $CO_2$ sequestration process described herein. Moreover, the $CO_2$ extraction system air cycle machine exhaust can be used to chill the gas turbine inlet air flow reducing the impact of the $CO_2$ sequestration system on the overall power plant. The $CO_2$ extraction system described herein can also be used in conjunction with any combined cycle gas turbine power plant to extract $CO_2$ from the exhaust gas and thus to reduce greenhouse gas emissions by facilitating the re-injection of the $CO_2$ into the ground for enhanced oil recovery or bottling and selling the $CO_2$, for example.

While the invention has been described in terms of various specific embodiments, those skilled in the art will recognize that the invention can be practiced with modification within the spirit and scope of the claims.

What is claimed is:

1. A method for reducing emissions in a power plant including a gas turbine engine assembly and a carbon dioxide ($CO_2$) separator, said method comprising:
    increasing an operating pressure of an exhaust stream discharged from the gas turbine engine assembly;
    reducing an operating temperature of the exhaust stream;
    substantially reducing a concentration of $CO_2$ entrained within the exhaust stream utilizing the $CO_2$ separator to produce a $CO_2$ lean exhaust stream;
    reducing the operating temperature of the $CO_2$ lean exhaust stream; and
    channeling the cooled $CO_2$ lean exhaust stream through a first flow path of a heat exchanger to reduce an operating temperature of a flow of ambient air channeled through a second flow path of the heat exchanger prior to entering the gas turbine engine assembly wherein the first and second flow paths are coupled in thermal communication and isolated in flow communication with respect to each other.

2. A method in accordance with claim 1, wherein increasing an operating pressure of the exhaust stream further comprises channeling the exhaust stream through a compressor to increase the operating pressure of the exhaust stream.

3. A method in accordance with claim 1, further comprising channeling substantially all of the exhaust stream discharged from the gas turbine engine assembly through the $CO_2$ separator.

4. A method in accordance with claim 1, further comprising:
    channeling the exhaust stream through a heat recovery steam generator to reduce the operating temperature of the exhaust stream; and
    channeling the exhaust stream discharged from the heat recovery steam generator through a compressor to facilitate increasing the operating pressure of the exhaust stream.

5. A method in accordance with claim 4, further comprising:
    reducing an operating temperature of the exhaust stream discharged from the compressor utilizing an intercooler; and
    channeling the relatively cool exhaust stream through the $CO_2$ separator.

6. A method in accordance with claim 1, wherein reducing the operating temperature of the $CO_2$ lean exhaust stream further comprises channeling the exhaust stream discharged from the $CO_2$ separator through an expander to facilitate reducing the operating temperature of the $CO_2$ lean exhaust stream.

7. A method in accordance with claim 6, further comprising channeling the cooled $CO_2$ lean exhaust stream through a heat exchanger to facilitate reducing the operating temperature of the gas turbine engine inlet airflow.

* * * * *